United States Patent [19]

Blatt et al.

[11] Patent Number: 5,125,632
[45] Date of Patent: Jun. 30, 1992

[54] ROTARY ACTUATED WORKPIECE HOLDER

[75] Inventors: John A. Blatt, 22 Stratton Pl., Grosse Pointe Shores, Mich. 48236; David C. Tomlin, Mt. Clemens, Mich.

[73] Assignee: John A. Blatt, Grosse Pointe Shores, Mich.

[21] Appl. No.: 647,452

[22] Filed: Jan. 29, 1991

[51] Int. Cl.$^5$ .............................................. B23Q 3/08
[52] U.S. Cl. .................................................... 269/32
[58] Field of Search ............... 92/88, 23; 269/20, 25, 269/27, 32, 91–94, 75, 99, 100, 97–98

[56] References Cited

U.S. PATENT DOCUMENTS

| | | |
|---|---|---|
| 599,562 | 2/1898 | Hurlbut . |
| 1,482,162 | 1/1924 | Streda . |
| 2,339,042 | 1/1944 | Anderson . |
| 2,486,494 | 11/1949 | Rice . |
| 2,556,648 | 6/1951 | Gorsuch . |
| 2,700,561 | 1/1955 | Svenson . |
| 2,790,520 | 4/1957 | Kuhn . |
| 2,806,451 | 9/1957 | Vinkler . |
| 2,841,429 | 7/1958 | McCuistion . |
| 2,873,132 | 2/1959 | Tanner . |
| 2,902,009 | 9/1959 | Ludwig . |
| 3,007,723 | 11/1961 | Clarke . |
| 3,030,934 | 4/1962 | Herbst . |
| 3,053,236 | 11/1962 | Self . |
| 3,128,679 | 4/1964 | Trendle . |
| 3,131,610 | 5/1964 | Paulus . |
| 3,158,376 | 11/1964 | Rentschler . |
| 3,189,360 | 6/1965 | Haberkorn . |
| 3,215,046 | 11/1965 | Drake . |
| 3,359,871 | 12/1967 | Kamman . |
| 3,436,071 | 4/1969 | Petruccelli . |
| 3,444,790 | 5/1969 | Rumsey . |
| 3,494,414 | 2/1970 | Warner . |
| 3,528,345 | 9/1970 | Rumsey . |
| 3,559,771 | 2/1971 | Crane . |
| 3,563,557 | 2/1971 | Doutt . |
| 3,854,737 | 12/1974 | Gilliam, Sr. . |
| 3,890,885 | 6/1975 | Nash . |
| 4,009,644 | 3/1977 | Higuchi . |
| 4,053,036 | 10/1977 | Branham . |
| 4,057,257 | 11/1977 | Berg . |
| 4,121,840 | 10/1978 | Berg . |
| 4,373,427 | 2/1983 | Garlapaty et al. . |
| 4,474,105 | 10/1984 | Eicher et al. . |
| 4,475,738 | 10/1984 | Eicher et al. . |
| 4,495,856 | 1/1985 | Sollami . |
| 4,545,290 | 10/1985 | Liberman . |
| 4,565,119 | 1/1986 | Higuchi . |
| 4,724,744 | 2/1988 | Rosengren . |
| 4,774,875 | 10/1988 | Amshoff . |
| 4,785,716 | 11/1988 | Vaughn et al. . |
| 4,813,341 | 3/1989 | Vaughn . |
| 4,817,503 | 4/1989 | Yamada . |
| 4,817,504 | 4/1989 | Lieberman . |
| 4,852,465 | 8/1989 | Rosengren . |

FOREIGN PATENT DOCUMENTS

| | | |
|---|---|---|
| 3222982 | 12/1983 | Fed. Rep. of Germany . |
| 1173682 | 2/1959 | France . |
| 2335692 | 7/1977 | France . |
| 809086 | 2/1959 | United Kingdom . |
| 893361 | 4/1962 | United Kingdom . |
| 926789 | 5/1963 | United Kingdom . |

*Primary Examiner*—Robert C. Watson
*Attorney, Agent, or Firm*—Basile and Hanlon

[57] ABSTRACT

A workpiece holder includes first and second workpiece engaging members, one of which is rotatable with respect to the other. A rotary actuator drives the rotatable workpiece engaging member between two positions relative to the other workpiece engaging member. The rotatable actuator includes opposed, radially extending vanes mounted on a rotatable shaft extending through a hollow, closed body. The rotatable workpiece engaging member is fixedly connected to and rotatable with the rotatable shaft. The vanes are disposed in the hollow body and respectively create a pair of chambers between themselves and circumferentially spaced legs formed in the body and extending radially inward into the interior cavity of the body toward the rotatable shaft. Pressurized fluid is alternately supplied to and exhausted from each pair of chambers to exert force on and rotate the vanes, the rotatable shaft and the rotatable workpiece engaging member between the two positions. A mounting plate or arm is connected to the body for mounting the workpiece holder to a support surface.

17 Claims, 3 Drawing Sheets

ROTARY ACTUATED WORKPIECE HOLDER

BACKGROUND OF THE INVENTION

1. Field of the Invention

This invention relates, in general, to workpiece holders for supporting workpieces in manufacturing operations.

2. State of the Art

Workpiece holders are employed in manufacturing operations to hold workpieces during manufacturing operations, such as, machining, welding or other forming operations, as well as to transport such workpieces between work stations. In automotive operations, workpiece holders are typically employed to handle vehicle body panels and subassemblies. These panels typically have lengths and widths of two or more feet and are frequently of irregular shape or formed with irregularly-shaped openings so that in order to stably and firmly support the panel, it is necessary that the work holders grip the panel at several locations along its peripheral edge or the edges of major openings in the panel.

Workpiece holders for such applications generally include a variety of grippers, clamps or vacuum cups which are mounted on support frames or support members. Despite the large variety of different types of workpiece holders, it is still desirable to provide a workpiece holder which has a low cost and an accurate operation. It would also be desirable to provide a workpiece holder which is capable of being mounted in a variety of positions via a number of different workpiece mounting members for use in a large number of different applications. It would also be desirable to provide a workpiece holder which is quick in operation and is capable of generating a high clamping or gripping force.

SUMMARY OF THE INVENTION

The present invention is a rotary actuated holder for holding a workpiece. The holder comprises first and second workpiece engaging members for engaging and holding a workpiece therebetween. The second workpiece member is rotatable with respect to the first workpiece engaging member between a first workpiece engaging position in combination with the first workpiece engaging member and a second workpiece disengaged position.

Rotary actuator means are provided for rotating the second workpiece engaging member between the first and second positions. The rotary actuator means includes a body having a closed exterior creating a hollow interior cavity. A rotatable shaft extends through the interior cavity in the body and has first and second ends, at least one of which extends outward from the body. The second workpiece engaging member is fixedly attached to the one end and, preferably, both ends of the rotatable shaft exteriorly of the body.

First and second circumferentially spaced flanges or legs are mounted within the interior cavity in the body and extend radially inward from the exterior of the body to a terminal end. The terminal ends of the first and second flanges are spaced apart and disposed on opposite sides of the rotary shaft. Each of the first and second flanges has opposed side walls. First and second vanes are connected to the rotatable shaft and extend radially outward therefrom in opposed directions into the interior cavity in the body. Cushion means are also mounted on at least one side and, preferably, both sides of the first and second vanes for cushioning the impact of the vanes and the sides of the first and second flanges in the body.

First and second fluid chambers are formed in the interior cavity in the body between the first vane and one side of the first and second flanges, respectively. Third and fourth fluid chambers are formed in the interior cavity in the body between the second vane and the opposed sides of the first and second flanges, respectively. Means are provided for alternately pressurizing and depressurizing the first and third chambers and for oppositely pressurizing and depressurizing the second and fourth chambers to rotate the first and second vanes, the rotatable shaft and the second workpiece engaging member between the first and second positions.

In a preferred embodiment, means are provided for connecting the first and third chambers in fluid flow communication and, also, means are provided for connecting the second and fourth chambers in fluid flow communication. In a preferred embodiment, the fluid flow connecting means comprises a first cross bore formed in the rotatable shaft extending between the first and third chambers and a second cross bore formed in the rotatable shaft separate from the first cross bore and extending between the second and fourth chambers.

In a preferred embodiment, the second workpiece engaging member includes a workpiece engaging end portion. First and second spaced flanges extend from the end portion of the second workpiece engaging member and are fixed to the rotatable shaft.

Means are provided for mounting the body to a support surface. In a preferred embodiment, a mounting plate is integrally formed with the body and extends substantially perpendicular to the first workpiece engaging member. At least one bore is formed in the mounting plate for receiving suitable fastener means to mount the mounting plate and the body to a support surface.

In an alternate embodiment, the mounting means comprises a third arm or plate which is disposed substantially co-planar with the first workpiece engaging member and extends outward from the body opposite from the first workpiece engaging member. In this embodiment, the third arm may be stationarily mounted to a support surface by means of fasteners extending through mounting bores formed in the arm.

In another embodiment, means for universally connecting the mounting plate or the third arm to a support surface is provided for positioning the mounting plate in three axes with respect to the support surface.

The rotary actuated workpiece holder of the present invention is simple in construction and provides accurate, repeatable positioning of the workpiece engaging members. Further, by utilizing two vanes, the action or movement of the rotary actuator and the attached workpiece engaging members between workpiece engaging and workpiece disengaged positions is fast and at high clamping or gripping forces. Finally, the rotary actuated workpiece holder of the present invention may be provided with a variety of different mounting arrangements so as to enable its use in a variety of applications.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
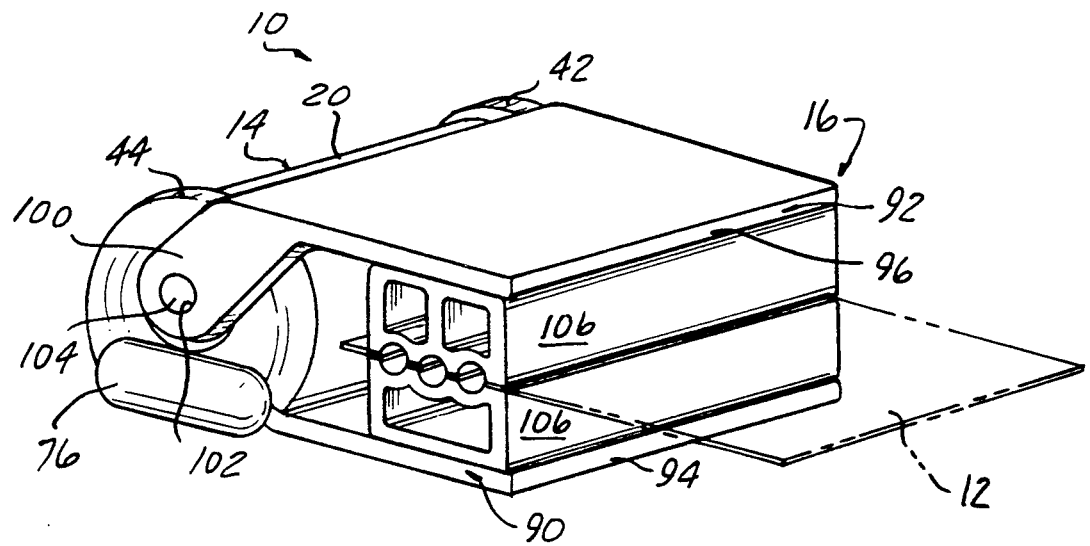
FIG. 1 is a perspective view of the rotary actuated workpiece holder of the present invention.

Referring now to the drawing, and to FIG. 1 in particular, there is illustrated a workpiece holder 10 for supporting a workpiece 12, such as a vehicle body panel, during a manufacturing operation.

As shown in FIGS. 1-4, the workpiece holder 10 includes rotary actuator means 14, workpiece holder engaging means 16 and mounting means 18. The rotary actuator means 14 includes a housing 20 which, by way of example only, has a generally cylindrical shape with a circular cross section. The housing 20 has a closed exterior wall which creates a hollow interior cavity 22 therein in conjunction with end plates 42 and 44. The end plates 42 and 44 are mounted on opposite sides of the body 20 and close off the hollow interior cavity 22 of the body 20.

Figure 2:
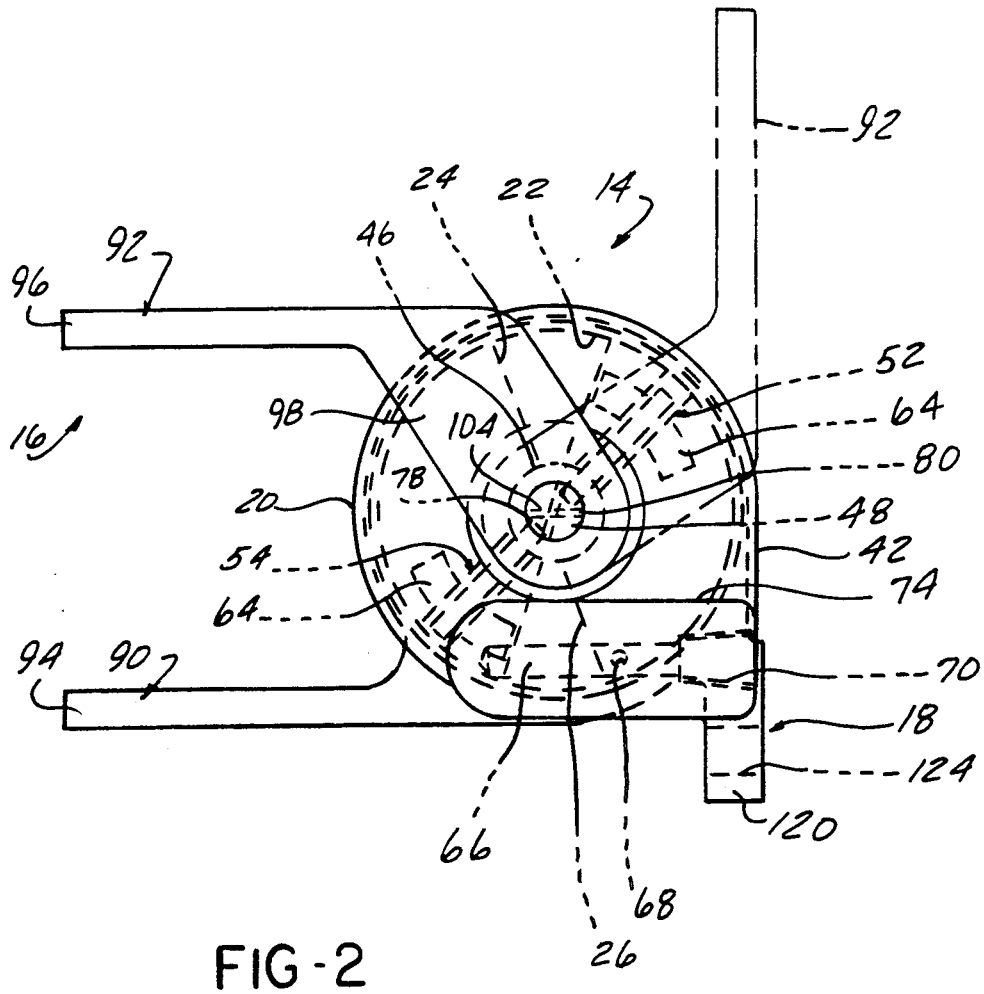
FIG. 2 is a side elevational view of the rotary actuated workpiece holder shown in FIG. 1.
Figure 4:
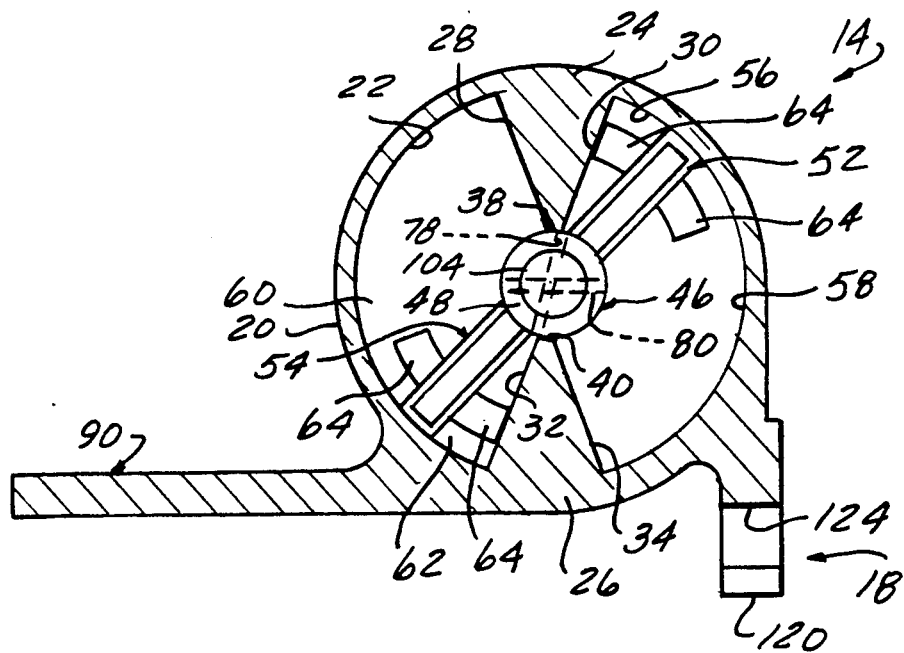
FIG. 4 is a partial, cross sectional view of the workpiece holder, generally taken along line 4—4 in FIG. 3.

First and second flanges or legs 24 and 26, respectively, as shown in FIGS. 2 and 4, are formed integrally with the body 20 and extend inward from opposed, circumferentially spaced portions of the exterior wall of the body 20. Each of the first and second legs 24 and 26 includes opposed side walls, such as side walls 28 and 30 for the first leg 24 and side walls 32 and 34 for the second leg 26. Each of the side walls 28, 30, 32 and 34 inclines inward from the exterior wall of the body 20 to a terminal end 36 and 38 for the first and second legs 24 and 26, respectively. The terminal ends 38 and 40 of the first and second legs 24 and 26 are spaced apart, as shown in FIG. 4.

A rotary shaft 46 having a generally cylindrical shape and a circular cross section is rotatably mounted in the body 20. The rotary shaft 46 has first and second ends 48 and 50, respectively. At least one and preferably both of the first and second ends 48 and 50 of the rotary shaft 46 extend outward through the end plates 42 and 44 of the body 20. Suitable seals, not shown, are provided between the rotary shaft 46 and the aligned bores in the end plates 42 and 44 to sealing close the interior cavity 22 of the body 20. Additional seals are also mounted between the terminal ends 38 and 40 of the legs 24 and 26 of the body 20 and the rotary shaft 46.

A plurality of vanes are connected to and extend radially outward from the rotary shaft 46. In a preferred embodiment, two vanes 52 and 54, respectively, extend radially outward from the rotary shaft 46. The first and second vanes 52 and 54 are co-planar and spaced 180° apart, as shown in FIGS. 2 and 4. Each of the vanes 52 and 54 comprise a generally planar strip which extends across substantially the entire length of the interior cavity 22 in the body 20.

The first and second vanes 52 and 54 divide the interior cavity 22 into separate chambers in conjunction with the first and second legs 24 and 26. Thus, the first vane 52 forms a first cavity 56 between itself and the side wall 30 of the first leg 24. A second chamber 58 is formed between the first vane 52 and the side wall 34 of the second leg 26. Similarly, a third chamber 60 is formed between the second vane 54 and the side wall 32 of the second leg 26; while a fourth chamber 62 is formed between the second vane 54 and the side wall 28 of the first leg 24.

Resilient means, such as bumpers or cushions 64, are mounted on at least and preferably both sides of each of the vanes 52 and 54, preferably adjacent the radially outermost ends of each of the vanes 52 and 54, to cushion the impact between the vanes 52 and 54 and the corresponding side walls of the legs 24 and 26 during operation of the rotary actuator 14, as described in greater detail hereafter.

Means are provided for alternately pressurizing and depressurizing each of the first, second, third and fourth chambers 56, 58, 60 and 62, respectively. The pressurizing and depressurizing means preferably comprises first and second ports 66 and 68, respectively. The ports 66 and 68 are disposed in fluid flow communication with the second chamber 58 and the third chamber 60, as shown in FIG. 2, and are respectively disposed adjacent the side walls 32 and 34 of the second leg 26 of the body 20.

Figure 3:
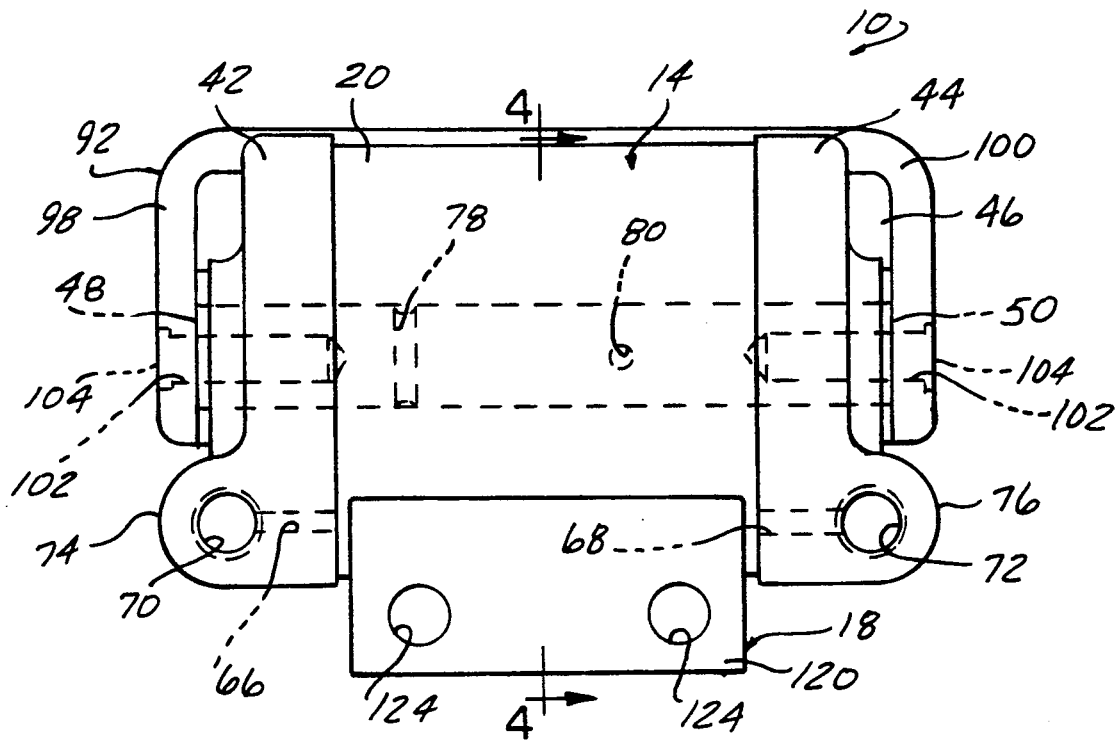
FIG. 3 is a rear elevational view of the workpiece holder shown in FIG. 1.

Although the ports 66 and 68 may be connected directly to suitable pressurizing and depressurizing means, in one embodiment, as shown in FIGS. 2 and 3, rear mounting ports 70 and 72 are formed in enlarged bottom portions of the end plates 42 and 44 and extend substantially perpendicular to and are connected in fluid flow communication with the respective ones of the ports 66 and 68. The ports 70 and 72 provide a rear connection for the pressurizing and depressurizing means as described hereafter. Such pressurizing and depressurizing means may be suitable solenoid operated electromechanical valves which are connected to a source of pressurized fluid, such as air or hydraulic fluid, and to exhaust or atmosphere.

Means are also provided for connecting each of the chambers in fluid flow communication with a radially opposed chamber in the body 20. The communicating means comprises a first cross bore 78 which is formed in the rotary shaft 46 and extends therethrough in fluid flow communication with the third chamber 60 and the first chamber 56. Similarly, a second, distinct cross bore 80 is formed in the rotary shaft 46 and extends in fluid flow communication between the second chamber 58 and the fourth chamber 62. In this manner, the first and third chambers 56 and 60 are disposed in fluid flow communication with the port 66; while the second and fourth chambers 58 and 62, respectively, are disposed in fluid flow communication with the port 68.

In operation, assuming the vanes 52 and 54 are in the position shown in FIGS. 2 and 4, the application of pressurized fluid to the port 66 and the simultaneous depressurizing of the fluid at the port 68 will cause the pressurized fluid to flow into and fill the first and third chambers 56 and 60. This applies a large force to the vanes 52 and 54 causing the vanes 52 and 54 and the rotary shaft 46 attached thereto to rotate in a clockwise direction, as shown in FIGS. 2 and 4, until the vanes 52 and 54 strike the side walls 34 and 28 of the legs 26 and 24. Alternately, pressurizing the port 68 and depressurizing the port 66 will cause pressurized fluid to flow into the second and fourth chambers 58 and 62, respectively, thereby applying force to the opposite sides of the vanes 52 and 54 and causing the vanes 52 and 54 and the attached rotary shaft 46 to rotate in a counterclockwise direction to the position shown in FIGS. 2 and 4. This bidirectional rotation of the vanes 52 and 54 and the rotary shaft 46 is fast due to the application of pressurized fluid to a large surface area formed by the two vanes 52 and 54.

The rotary actuated workpiece holder 10 of the present invention also includes workpiece engaging members denoted in general by reference number 16. The workpiece engaging members preferably comprise first and second workpiece engaging members 90 and 92, respectively. The first workpiece engaging member 90 is preferably in the form of a planar arm which is integrally formed with, such as by casting, with the body 20. The first arm 90 extends outward from one side of the body 20 as shown in FIGS. 1, 2 and 4. The workpiece engaging end portion 94 of the first workpiece engaging member 90 may have any shape or size to suit the needs of a particular application. By way of example only, the workpiece engaging end portion 94 has a generally planar shape.

The second workpiece engaging member 92 has a similar flat workpiece engaging end 96 as shown in FIGS. 1, 2 and 3. The second workpiece engaging member 92 includes a pair of side flanges 98 and 100 which extend angularly from opposite sides of the workpiece engaging end portion 96. Aligned bores 102 are formed in the flanges 98 and 100 and receive pins 104, as shown in FIG. 3, to fixedly connect the side flanges 98 and 100 of the second workpiece engaging member 92 to the rotary shaft 46. In this manner, the second workpiece engaging member 92 rotates between a first workpiece engaging position shown in FIG. 1 and a spaced, non-workpiece engaging position shown in phantom in FIG. 2 upon rotation of the rotary shaft 46 and the vanes 52 and 54 as described above.

Suitable workpiece engaging resilient pads 106, such as urethane pads, may be mounted on the opposed end portions 94 and 96 of the first and second workpiece engaging members 90 and 92 to engage the workpiece 12.

Figure 6:
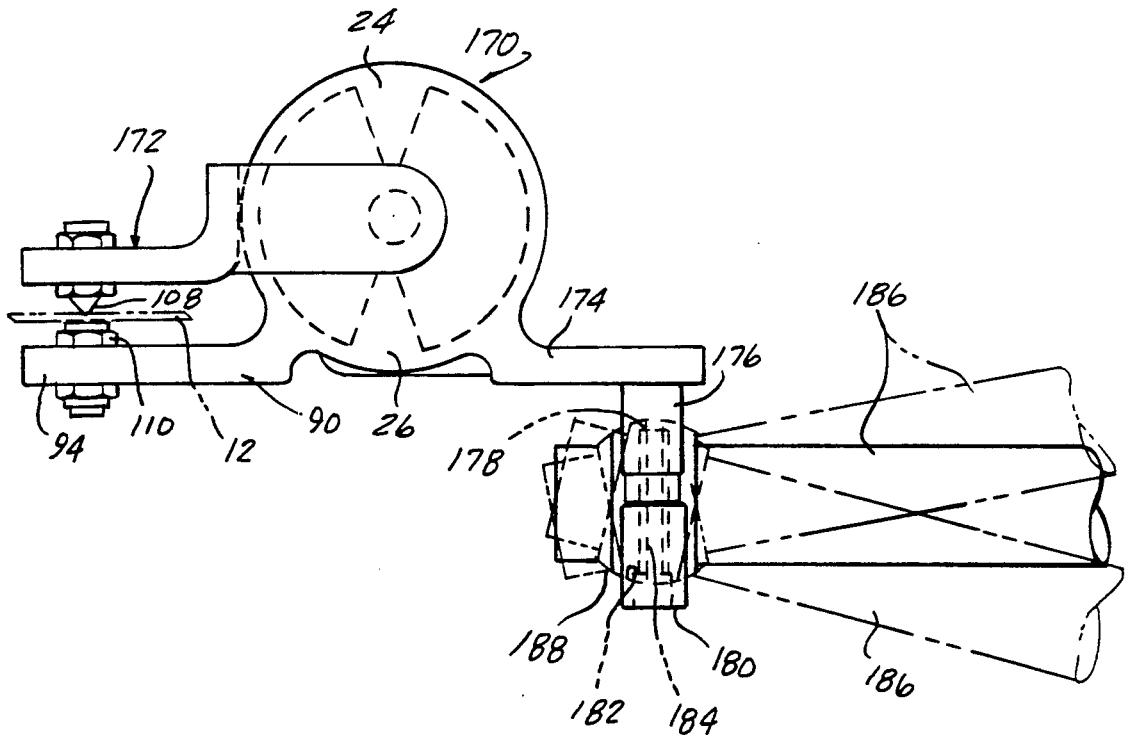
FIG. 6 is a side elevational view of yet another embodiment of the rotary actuated workpiece holder of the present invention.

In an alternate embodiment shown in FIG. 6, a contact point 108 and a contact pad 110 are mounted by suitable fasteners to the end portions of the first and second workpiece engaging member 90 and 172 for securely contacting and holding a workpiece therebetween.

The rotary actuated workpiece holder 10 also includes mounting means 16 for securely mounting the workpiece holder body 20 to a support surface, such as a frame, tool, etc. The mounting means 16, in a first embodiment, comprises a planar mounting plate 120, FIGS. 1, 3 and 4 which is connected to or integrally formed with the body 20 of the workpiece holder 10. The mounting plate 120 is oriented substantially perpendicular to the first workpiece engaging member 90 so as to permit the workpiece holder 10 to be mounted in the orientation shown in FIGS. 1-4. One or more bores 124 are formed in the mounting plate 120 to receive suitable fasteners, not shown, for securing the mounting plate 120 and the body 20 to a suitable support.

Figure 5:
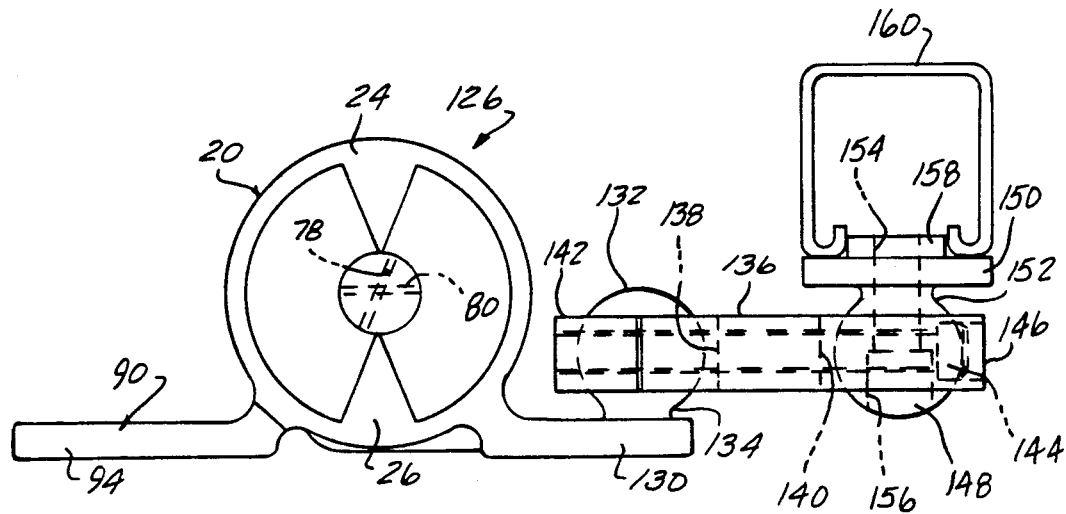
FIG. 5 is a side elevational view of another embodiment of the rotary actuated workpiece holder of the present invention.

An alternate embodiment of a rotary actuated workpiece holder 126 is shown in FIG. 5. In this embodiment, the body 20 is identical to that described above and includes movable vanes which have been deleted for purposes of clarity. The mounting plate in this embodiment comprises a third arm 130 substantially co-planar to the first workpiece engaging member 90; but extending outward from the body 20 opposite from the first workpiece engaging member 90. A spherical ball 132 is securely mounted on one end of the third arm 130 by a reduced diameter neck 134. A plate 136 has a semi-spherical recess 138 formed adjacent a first end and a similar semi-spherical recess 140 formed in an opposed end. A clamp plate 142 having a similar semi-spherical recess is associated with and spaced from the recess 138 in one end of the plate 136 and is secured thereto by suitable fasteners, such as one or more elongated screws 144, which extend through the plate 136 and the clamp plate 142 to securely connect the plate 136 and the clamp plate 142 to the spherical ball 132 in any orientation along three axes of movement.

Another clamp plate 146 having a semi-spherical recess is associated with the spherical recess 140 in the opposite end of the plate 136 and is secured thereto by means of the screws 144. The spherical recess formed between the clamp plate 146 and the plate 136 is mounted about a second spherical ball 148 which is connected to a base plate 150 by means of a reduced diameter neck 152. A bore 154 extends through the second spherical ball 148 and the base plate 150 and is provided with an enlarged counter bore 156 adjacent one end. A bolt, not shown, extends through the counter bore 156 and the bore 154 in the second spherical ball 148 and the base plate 150 to threadingly engage a tapped bore in a clamp plate 158 located in the interior of a channel-like support frame or member 160. The bolt secures the spherical ball 148 and the base plate 150 in the support member 160 to securely mount the rotary actuated workpiece holder 126 to the support 160. The workpiece holder 126 can be positioned at any orientation along three axes with respect to the support member or frame 160 via the spherical balls 132 and 148 and the clamp plates.

Another embodiment of the workpiece holder 170 of the present invention is shown in FIG. 6. In this embodiment, the rotary actuator means is substantially identical to that described above and the vanes, end plates and fluid flow ports have been deleted for purposes of clarity. The second workpiece engaging member 172 has a different orientation than the flat, planar shape described above for the second workpiece engaging member 92. In this embodiment, the end portion of the second workpiece engaging member 172 is substantially co-planar with the flanges 173 to be more closely spaced to the first workpiece engaging member 90.

The mounting means employed in the embodiment shown in FIG. 6 comprises a third leg 174 which is substantially co-planar to the first workpiece engaging member 90; but extends outward from the opposite side of the body of the workpiece holder 170. A boss 176 having a semi-circular recess 178 is securely attached to, such as be welding, to the third leg 174. A clamp plate 180 having a similar semi-spherical recess 182 is attached to the boss 176 by means of a bolt, not shown, which extends through a bore 184 in the clamp plate 180 and the boss 176. A rod 186 having a spherical end portion 188 may be mounted within the joined boss 176 and clamp plate 180 and oriented in any position along three axes, as shown in solid and in phantom in FIG. 6, to position the workpiece holder 170 at any desired orientation along three axes with respect to a support frame or member, also not shown, attached to an outer end of the rod 186.

In summary, there has been disclosed a unique rotary actuated workpiece holder which is ideally suited for holding workpieces in manufacturing operations. The rotary actuated workpiece holder of the present invention provides a quick and accurate clamping or gripping movement and yet is simple in construction for a low manufacturing cost. The holder also generates a large clamping force for securely holding a workpiece.

What is claimed is:

1. A holder for holding a workpiece comprising:
   first and second workpiece engaging means for engaging and holding a workpiece therebetween, the second workpiece engaging means being rotatable with respect to the first workpiece engaging means between a first workpiece engaging position in combination with the first workpiece engaging means and a second workpiece disengaged position;
   rotary actuator means for rotating the second workpiece engaging means between the first and second positions, the rotary actuator means including:
   a body having a closed exterior defining a hollow, closed interior cavity;
   a rotatable shaft extending through the interior cavity in the body, the rotatable shaft having first and second ends, at least one end extending outward from the body, the second workpiece engaging means fixedly connected to the at least one end of the rotatable shaft;
   first and second circumferentially spaced flanges mounted within the interior cavity in the body and extending radially inward from the exterior of the body to a terminal end, the terminal ends of the first and second flanges being spaced apart and disposed on opposite sides of the rotatable shaft, each of the first and second flanges having opposed sides;
   first and second vanes connected to the rotatable shaft and extending radially outward from the rotatable shaft into the interior cavity in the body;
   first and second fluid chambers formed in the interior cavity in the body between the first vane and one side of the first and second flanges, respectively;
   third and fourth fluid chambers formed in the interior cavity in the body between the second vane and the opposite sides of the second and third flanges, respectively;
   means for alternatingly pressurizing and depressurizing the first and third chambers and for concurrently depressurizing and pressurizing the second and fourth chambers to rotate the first and second vanes, the rotatable shaft and the second workpiece engaging means between the first and second positions; and
   the first workpiece engaging means integrally formed with the body of the rotary actuator means.

2. The holder of claim 1 wherein the means for alternatingly pressurizing and depressurizing comprises:
   means for disposing the first and second chambers in fluid flow communication; and
   means for disposing the second and fourth chambers in fluid flow communication.

3. The holder of claim 2 wherein the fluid flow communication disposing means comprises:
   a first cross bore formed in the rotatable shaft and extending between the first and third chambers to dispose the first and third chambers in fluid flow communication; and
   a second cross bore formed in the rotatable shaft and extending between the second and fourth chambers to connect the second and fourth chambers in fluid flow communication.

4. The holder of claim 2 further including:
   port means formed in the body and disposed in fluid flow communication with the first and third and the second and fourth chambers, respectively.

5. The holder of claim 1 wherein the second workpiece engaging means comprises:
   a workpiece engaging end portion extending along an entire longitudinal length of the rotatable shaft; and
   first and second spaced flanges extending from the workpiece engaging end portion, the first and second flanges being fixedly connected to opposite ends of the rotatable shaft and rotatable with the rotatable shaft.

6. A holder for holding a workpiece comprising:
   first and second workpiece engaging means for engaging and holding a workpiece therebetween, the second workpiece engaging member being rotatable with respect to the first workpiece engaging member between a first workpiece engaging position in combination with the first workpiece engaging member and a second workpiece disengaged position;
   rotary actuator means for rotating the second workpiece engaging member between the first and second positions, the rotary actuator means including a body having a closed exterior defining a hollow, closed interior cavity, a rotatable shaft extending through the interior cavity in the body, the rotatable shaft having first and second ends, at least one end extending outward from the body, the second workpiece engaging member fixedly connected to the at least one end of the rotatable shaft, first and second circumferentially spaced flanges mounted within the interior cavity in the body and extending radially inward from the exterior of the body to a terminal end, the terminal ends of the first and second flanges being spaced apart and disposed on opposite sides of the rotatable shaft, each of the first and second flanges having opposed sides, first and second vanes are connected to the rotatable shaft and extending radially outward from the rotatable shaft into the interior cavity in the body, first and second fluid chambers formed in the interior cavity in the body between the first vane and one side of the first and second flanges, respectively, and third and fourth fluid chambers formed in the interior cavity in the body between the second vane and the opposite sides of the second and first flanges, respectively;
   means for alternatingly pressurizing and depressurizing the first and third chambers and for concurrently depressurizing and pressurizing the second and fourth chambers to rotate the first and second vanes, the rotatable shaft and the second workpiece engaging member between the first and second positions, wherein the means for alternatingly pressurizing and depressurizing includes means for disposing the first and second chambers in fluid flow communication, and means for disposing the second and fourth chambers in fluid flow communication; and cushion means mounted on at least one side of each of the first and second vanes for cushioning the impact between the first and second vanes and the first and second flanges in the body.

7. A holder for holding a workpiece comprising:

first and second workpiece engaging means for engaging and holding a workpiece therebetween, the second workpiece engaging member being rotatable with respect to the first workpiece engaging member between a first workpiece engaging position in combination with the first workpiece engaging member and a second workpiece disengaged position;

rotary actuator means for rotating the second workpiece engaging member between the first and second positions, the rotary actuator means including a body having a closed exterior defining a hollow, closed interior cavity, a rotatable shaft extending through the interior cavity in the body, the rotatable shaft having first and second ends, at least one end extending outward from the body, the second workpiece engaging member fixedly connected to the at least one end of the rotatable shaft, first and second circumferentially spaced flanges mounted within the interior cavity in the body and extending radially inward from the exterior of the body to a terminal end, the terminal ends of the first and second flanges being spaced apart and disposed on opposite sides of the rotatable shaft, each of the first and second flanges having opposed sides, first and second vanes are connected to the rotatable shaft and extending radially outward from the rotatable shaft into the interior cavity in the body, first and second fluid chambers formed in the interior cavity in the body between the first vane and one side of the first and second flanges, respectively, and third and fourth fluid chambers formed in the interior cavity in the body between the second vane and the opposite sides of the second and first flanges, respectively;

means for alternatingly pressurizing and depressurizing the first and third chambers and for concurrently depressurizing and pressurizing the second and fourth chambers to rotate the first and second vanes, the rotatable shaft and the second workpiece engaging member between the first and second positions;

wherein the second workpiece engaging member includes a workpiece engaging end portion, and first and second spaced flanges extending from the workpiece engaging end portion, the first and second flanges being fixedly connected to and rotatable with the rotatable shaft; and pairs of cushion means mounted on opposite sides of each of the first and second vanes.

8. The holder of claim 1 further including mounting means for mounting the body to a support surface.

9. The holder of claim 8 wherein the mounting means comprises:

a mounting plate connected to the body, the mounting plate being disposed at an angle with respect to the first workpiece engaging means;

at least one bore formed in the mounting plate for receiving fastening means to mount the mounting plate to a support surface.

10. A holder for holding a workpiece comprising:

first and second workpiece engaging means for engaging and holding a workpiece therebetween, the second workpiece engaging member being rotatable with respect to the first workpiece engaging member between a first workpiece engaging position in combination with the first workpiece engaging member and a second workpiece disengaged position;

rotary actuator means for rotating the second workpiece engaging member between the first and second positions, the rotary actuator means including a body having a closed exterior defining a hollow, closed interior cavity, a rotatable shaft extending through the interior cavity in the body, the rotatable shaft having first and second ends, at least one end extending outward from the body, the second workpiece engaging member fixedly connected to the at least one end of the rotatable shaft, first and second circumferentially spaced flanges mounted within the interior cavity in the body and extending radially inward from the exterior of the body to a terminal end, the terminal ends of the first and second flanges being spaced apart and disposed on opposite sides of the rotatable shaft, each of the first and second flanges having opposed sides, first and second vanes are connected to the rotatable shaft and extending radially outward from the rotatable shaft into the interior cavity in the body, first and second fluid chambers formed in the interior cavity in the body between the first vane and one side of the first and second flanges, respectively, and third and fourth fluid chambers formed in the interior cavity in the body between the second vane and the opposite sides of the second and first flanges, respectively;

means for alternatingly pressurizing and depressurizing the first and third chambers and for concurrently depressurizing and pressurizing the second and fourth chambers to rotate the first and second vanes, the rotatable shaft and the second workpiece engaging member between the first and second positions, and mounting means for mounting the body to a support surface, wherein the mounting means includes a third arm disposed substantially co-planar with the first workpiece engaging member and extending outward from the body opposite from the first workpiece engaging member, and at least one bore formed in the mounting plate for receiving a fastening means to mount the mounting plate to a support surface.

11. A holder for holding a workpiece comprising:

first and second workpiece engaging means for engaging and holding a workpiece therebetween, the second workpiece engaging member being rotatable with respect to the first workpiece engaging member between a first workpiece engaging position in combination with the first workpiece engaging member and a second workpiece disengaged position;

rotary actuator means for rotating the second workpiece engaging member between the first and second positions, the rotary actuator means including a body having a closed exterior defining a hollow, closed interior cavity, a rotatable shaft extending through the interior cavity in the body, the rotatable shaft having first and second ends, at least one end extending outward from the body, the second workpiece engaging member fixedly connected to the at least one end of the rotatable shaft, first and second circumferentially spaced flanges mounted within the interior cavity in the body and extending radially inward from the exterior of the body to a terminal end, the terminal ends of the first and second flanges being spaced apart and disposed on opposite sides of the rotatable shaft, each of the first and second flanges having opposed sides, first and second vanes are connected to the rotatable shaft and extending radially outward from the rotatable shaft into the interior cavity in the body, first and second fluid chambers formed in the interior cavity in the body between the first vane and one side of the first and second flanges, respectively, and third and fourth fluid chambers formed in the interior cavity in the body between the second vane and the opposite sides of the second and first flanges, respectively;

means for alternatingly pressurizing and depressurizing the first and third chambers and for concurrently depressurizing and pressurizing the second and fourth chambers to rotate the first and second vanes, the rotatable shaft and the second workpiece engaging member between the first and second positions;

mounting means for mounting the body to a support surface, wherein the mounting means includes a mounting plate connected to the body and means for universally connecting the mounting plate to a support surface for positioning the mounting plate along three axes with respect to the support surface.

12. A holder for holding a workpiece comprising:

first and second workpiece engaging members for engaging and holding a workpiece therebetween, the second workpiece engaging member being rotatable with respect to the first workpiece engaging member between a first workpiece engaging position in combination with the first workpiece engaging member and a second workpiece disengaged position;

rotary actuator means for rotating the second workpiece engaging member between the first and second positions, the rotary actuator means including:
- a body having a closed exterior defining a hollow, closed interior cavity;
- a rotatable shaft extending through the interior cavity in the body, the rotatable shaft having first and second ends, at least one end extending outward from the body, the second workpiece engaging member fixedly connected to the at least one end of the rotatable shaft;
- first and second circumferentially spaced flanges mounted within the interior cavity in the body and extending radially inward from the exterior of the body to a terminal end, the terminal ends of the first and second flanges being spaced apart and disposed on opposite sides of the rotatable shaft, each of the first and second flanges having opposed sides;
- first and second vanes connected to the rotatable shaft and extending radially outward from the rotatable shaft into the interior cavity in the body;
- first and second fluid chambers formed in the interior cavity in the body between the first vane and one side of the first and second flanges, respectively;
- third and fourth fluid chambers formed in the interior cavity in the body between the second vane and the opposite sides of the second and third flanges, respectively;
- means for disposing the first and third fluid chambers in fluid chambers in fluid flow communication; and
- means for disposing the second and fourth chambers in fluid flow communication;

means for alternatingly pressurizing and depressurizing the first and third chambers and for concurrently depressurizing and pressurizing the second and fourth chambers to rotate the first and second vanes, the rotatable shaft and the second workpiece engaging member between the first and second positions;

means for mounting the body to a support surface; and said first workpiece engaging member having a planar configuration and formed integrally with said body of said rotary actuator means to extend along an entire longitudinal length of said body.

13. A holder for holding a workpiece comprising:

first and second workpiece engaging means for engaging and holding a workpiece therebetween, the second workpiece engaging means being rotatable with respect to the first workpiece engaging means between a first workpiece engaging position in combination with the first workpiece engaging means and a second workpiece disengaged position; and rotary actuator means for rotating the second workpiece engaging means between the first and second positions, the rotary actuator means including a body having a closed exterior defining a hollow, closed interior cavity and a rotatable shaft extending through the interior cavity in the body, the rotatable shaft having first and second ends, at least one end extending outward from the body, the second workpiece engaging means fixedly connected to the at least one end of the rotatable shaft and the first workpiece engaging means integrally formed with the body.

14. The holder of claim 13 further comprising:

mounting means connected to the body for mounting the body to a support surface and for positioning the body along three axes with respect to the support surface.

15. The holder of claim 13 further comprising:

resilient workpiece engaging pad means mounted on opposed end portions of the first and second workpiece engaging means.

16. The holder of claim 13 further comprising:

contact point and pad workpiece engaging means mounted on opposed end portions of the first and second workpiece engaging means for contacting and holding a workpiece therebetween.

17. The holder of claim 13 further comprising:

the first and second workpiece engaging means having a generally planar form and extending generally along an entire longitudinal length of the rotator actuator means, the first workpiece engaging means integrally formed generally along the entire longitudinal length of the body and the second workpiece engaging means having outwardly extending flanges from opposite longitudinal ends thereof for fixedly connecting the second workpiece engaging means to each end of the rotatable shaft extending outwardly from the body.

* * * * *